(12) United States Patent
Heeren

(10) Patent No.: US 11,565,786 B2
(45) Date of Patent: Jan. 31, 2023

(54) AIRCRAFT DOOR SEALING SYSTEM AND AIRCRAFT DOOR ARRANGEMENT

(71) Applicant: Airbus Operations GmbH, Hamburg (DE)

(72) Inventor: Jens Heeren, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 618 days.

(21) Appl. No.: 16/661,144

(22) Filed: Oct. 23, 2019

(65) Prior Publication Data

US 2020/0130806 A1   Apr. 30, 2020

(30) Foreign Application Priority Data

Oct. 30, 2018   (DE) .......................... 102018127024.0

(51) Int. Cl.
| | |
|---|---|
| *B64C 1/14* | (2006.01) |
| *F16J 15/02* | (2006.01) |
| *E06B 7/23* | (2006.01) |

(52) U.S. Cl.
CPC ........... *B64C 1/1461* (2013.01); *F16J 15/022* (2013.01); *F16J 15/027* (2013.01); *E06B 7/2312* (2013.01)

(58) Field of Classification Search
CPC .......... F16J 15/022; F16J 15/027; B64C 1/14; B64C 1/1407; B64C 1/1461; E06B 7/2312
See application file for complete search history.

(56) References Cited

U.S. PATENT DOCUMENTS

| | | | | |
|---|---|---|---|---|
| 2,560,665 | A * | 7/1951 | Stark | B64C 1/14 49/477.1 |
| 2,969,252 | A * | 1/1961 | Gruver | E06B 7/23 277/645 |
| 4,312,153 | A * | 1/1982 | Parkinson | B64C 1/14 49/40 |
| 5,581,951 | A * | 12/1996 | Ryan | E06B 7/2309 49/489.1 |
| 6,401,398 | B1 | 6/2002 | Panayides et al. | |
| 6,581,877 | B2 * | 6/2003 | Pauly | B64C 7/00 244/119 |
| 6,655,635 | B2 * | 12/2003 | Maury | F16J 15/027 244/119 |
| 7,219,899 | B2 * | 5/2007 | Kesseg | B60J 10/80 277/921 |

(Continued)

*Primary Examiner* — Nicholas L Foster
(74) *Attorney, Agent, or Firm* — Greer, Burns & Crain, Ltd.

(57) ABSTRACT

An aircraft door sealing system comprises a resilient sealing element secured to an aircraft door arrangement first element and comprising a sealing lip extending from a sealing member. A rigid counter-bearing element is secured to an aircraft door arrangement second element and cooperates with the sealing element to seal a gap between the first and second elements. The counter-bearing element comprises a first portion cooperating with the sealing member and a second portion cooperating with the sealing lip. The sealing lip and the second portion are positioned relative to each other, and the sealing lip can be resiliently deformed, so that the sealing lip is applied to the second portion and a contact face between the sealing lip and the second portion is formed or increases, when an external pressure acting on an outer face of the sealing lip via the gap, exceeds a threshold value.

13 Claims, 2 Drawing Sheets

(56) References Cited

U.S. PATENT DOCUMENTS

| | | | |
|---|---|---|---|
| 8,740,148 B2* | 6/2014 | Risch | B64C 1/14 244/129.5 |
| 9,617,783 B2* | 4/2017 | Yahata | F16J 15/027 |
| 9,682,765 B2* | 6/2017 | Paul | E06B 7/22 |
| 9,731,776 B1* | 8/2017 | Shen | F16J 15/025 |
| 9,777,838 B2* | 10/2017 | Yahata | F16J 15/027 |
| 9,956,858 B2* | 5/2018 | Sobue | F16J 15/025 |
| 10,011,363 B2* | 7/2018 | Perrier | B64D 15/04 |
| 10,689,090 B2* | 6/2020 | Perez | B64C 1/1407 |
| 10,882,599 B2* | 1/2021 | Fischer | B64C 1/1461 |
| 11,066,179 B2* | 7/2021 | Ramlaoui | B64D 29/00 |
| 11,203,405 B2* | 12/2021 | Casse | F16J 15/48 |
| 11,203,406 B2* | 12/2021 | Hackenberg | B64C 1/1461 |
| 2003/0006344 A1* | 1/2003 | Pauly | F16J 15/027 244/130 |
| 2006/0108747 A1* | 5/2006 | Kesseg | B60J 10/80 277/650 |
| 2008/0012244 A1* | 1/2008 | Kesseg | F16J 15/025 277/645 |
| 2008/0164373 A1* | 7/2008 | Roming | B64C 1/14 244/129.5 |
| 2009/0113954 A1* | 5/2009 | De Resseguier | E05C 19/002 70/91 |
| 2010/0078897 A1* | 4/2010 | McPeek, Jr. | F16J 15/108 277/637 |
| 2011/0037228 A1* | 2/2011 | Thomas, Jr. | F16J 15/027 277/312 |
| 2011/0042517 A1* | 2/2011 | Depeige | B64C 1/1461 244/129.5 |
| 2014/0345199 A1* | 11/2014 | Yahata | B64C 1/14 49/475.1 |
| 2015/0026656 A1 | 1/2015 | Yu | |
| 2015/0344122 A1* | 12/2015 | Paul | E06B 7/2303 244/129.5 |
| 2016/0114895 A1* | 4/2016 | Perrier | B64D 15/12 244/134 R |
| 2017/0016761 A1 | 1/2017 | Denteneer | |
| 2017/0167611 A1* | 6/2017 | Yahata | E06B 7/23 |
| 2017/0274750 A1* | 9/2017 | Sobue | F16J 15/027 |
| 2017/0342764 A1* | 11/2017 | Headrick | E06B 7/2312 |
| 2017/0369146 A1* | 12/2017 | Perez | B64C 1/1461 |
| 2018/0170512 A1* | 6/2018 | Fischer | B64C 1/1461 |
| 2019/0256186 A1* | 8/2019 | Casse | B64C 1/1415 |
| 2020/0062371 A1* | 2/2020 | Hackenberg | B64F 5/10 |

* cited by examiner

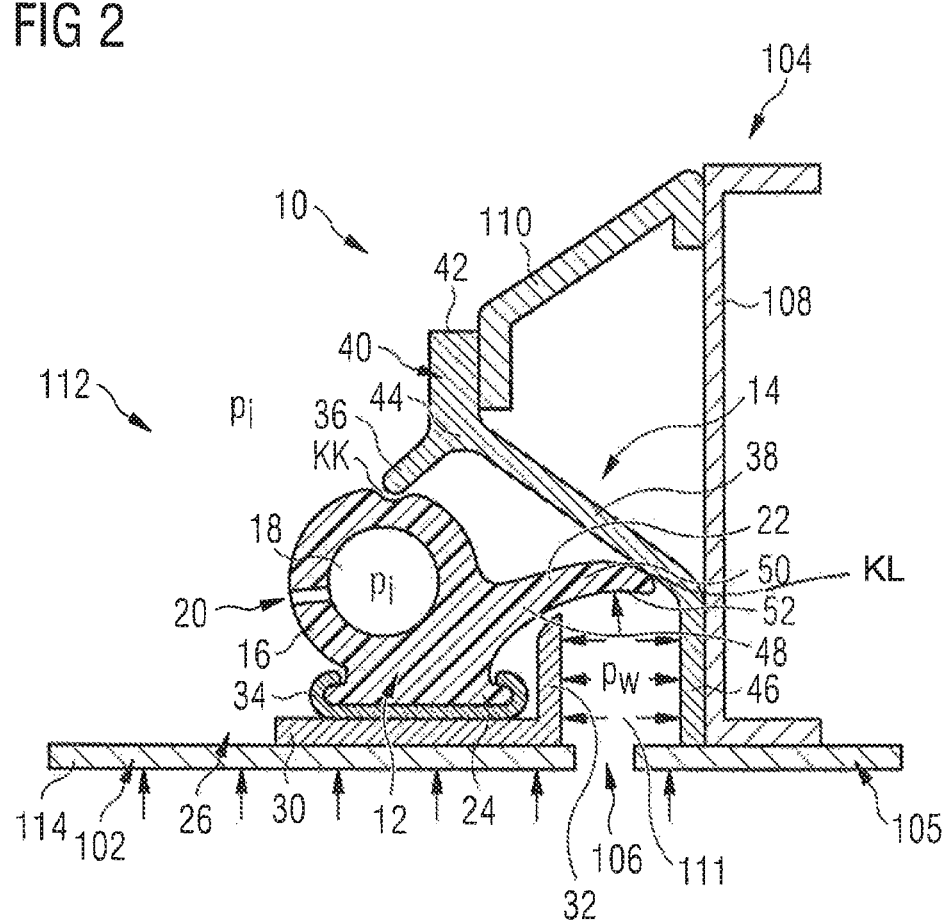

AIRCRAFT DOOR SEALING SYSTEM AND AIRCRAFT DOOR ARRANGEMENT

CROSS-REFERENCES TO RELATED APPLICATIONS

This application claims the benefit of the German patent application No. 102018127024.0 filed on Oct. 30, 2018, the entire disclosures of which are incorporated herein by way of reference.

FIELD OF THE INVENTION

The present invention relates to an aircraft door sealing system and an aircraft door arrangement which is provided with such a sealing system.

BACKGROUND OF THE INVENTION

Aircraft door seals are used to seal a cabin region which is located in an inner space of the aircraft with respect to an aircraft environment. An aircraft door seal which is suitable for use in a modern commercial aircraft must be capable of sealing a pressurized aircraft cabin region during flight operation of the aircraft in a secure manner with respect to the aircraft environment in spite of the considerable pressure differences between an ambient pressure and an internal pressure which is increased in comparison with the ambient pressure. Furthermore, the aircraft door seal must ensure that, in the event of a water landing of the aircraft, at least for a specific period of time, no or only little water enters the inner space of the aircraft.

SUMMARY OF THE INVENTION

An object of the present invention is to provide an aircraft door sealing system which seals an aircraft inner space in the event of an increased external pressure acting on the sealing system in a particularly effective manner. Furthermore, an object of the invention is to provide an aircraft door arrangement which is provided with such a sealing system.

An aircraft door sealing system comprises a sealing element which comprises a resilient material and which can be secured to a first element of an aircraft door arrangement. The sealing element may, for example, comprise an elastomer material, in particular a rubber material. In the material selection for the sealing element, it is significant that the sealing element is resiliently deformable to the desired extent, but at the same time sufficiently robust in order to be able to withstand the mechanical loads to which the sealing element is subjected during use in an aircraft door arrangement. The sealing element comprises a sealing member and a sealing lip which extends from the sealing member.

Furthermore, the aircraft door sealing system comprises a counter-bearing element which comprises a rigid material and which can be secured to a second element of the aircraft door arrangement and which is configured to cooperate with the sealing element in order to seal a gap which is present between the first and the second element of the aircraft door arrangement. The counter-bearing element may, for example, comprise metal or a plastics material, in particular a fiber-reinforced plastics material. In the material selection for the counter-bearing element, it is significant that the counter-bearing element is sufficiently rigid in order not to deform or to deform only to an insignificant degree when cooperating with the sealing element. The counter-bearing element comprises a first counter-bearing portion which is provided for cooperating with the sealing member of the sealing element and a second counter-bearing portion which is provided to cooperate with the sealing lip of the sealing element.

The first element of the aircraft door arrangement may, for example, be an aircraft door. The second element of the aircraft door arrangement may in contrast be constructed in the form of a door frame which surrounds a door opening formed in an aircraft fuselage. A transposed arrangement is, however, also conceivable, that is to say, the sealing element of the aircraft door sealing system may also be able to be secured to a first element of the aircraft door arrangement which is constructed in the form of a door frame, while the counter-bearing element of the aircraft door sealing system may also be able to be secured to a second element of the aircraft door arrangement which is constructed in the form of a door. In such a case, a corresponding adaptation of the shape and the orientation of the sealing element and the counter-bearing element is required. The sealing element and the counter-bearing element are preferably constructed in such a manner that in the state in which the aircraft door sealing system is mounted in an aircraft door arrangement, they extend around the entire periphery of the door opening and consequently can ensure complete sealing of the gap present between the first and the second element of the aircraft door arrangement.

The sealing lip and the second counter-bearing portion are positioned relative to each other in such a manner and the sealing lip can be resiliently deformed in such a manner that the sealing lip is applied to the second counter-bearing portion and forms or increases a contact face between the sealing lip and the second counter-bearing portion when an external pressure which, when the aircraft door sealing system is mounted in the aircraft door arrangement, acts on an outer face of the sealing lip via the gap between the first and the second element of the aircraft door arrangement, exceeds a threshold value. The threshold value of the external pressure, at which a resilient deformation of the sealing lip occurs, may be adjusted by an appropriate sizing of the sealing lip and a corresponding material selection for the sealing lip. In a preferred embodiment of the aircraft door sealing system, the sealing member and the sealing lip of the sealing element are integral and constructed from the same material. The adjustment of the external pressure threshold value, at which a resilient deformation of the sealing lip occurs, is then carried out by means of a corresponding selection of the shape and a corresponding sizing of the sealing lip.

During normal flight operation of an aircraft which is provided with the aircraft door sealing system, an external pressure which is lower than the atmospheric pressure at sea level acts on the outer face of the sealing lip. The outer face of the sealing lip is then in the non-loaded state and is not or with only a small contact face in contact with the second counter-bearing portion. Also in normal ground operation of an aircraft which is provided with the aircraft door sealing system, if the external pressure acting on the outer face of the sealing lip substantially corresponds to the internal pressure in a cabin of the aircraft, the sealing lip is preferably still unloaded. If, however, an increased external pressure acts on the outer face of the sealing lip, there is produced a resilient deformation of the sealing lip, which leads to an increase of the contact face between the sealing lip and the second counter-bearing portion and which consequently brings about secure sealing of the gap present between the first and the second element of the aircraft door arrangement.

In a preferred embodiment of the aircraft door sealing system, the threshold value of the external pressure which acts on the outer face of the sealing lip and at which the sealing lip is resiliently deformed in such a manner that it is applied to the second counter-bearing portion corresponds to the water pressure which acts on the outer face of the sealing lip in the event of a water landing of an aircraft which is provided with the aircraft door sealing system. In the event of a water landing, the cabin of the aircraft is then particularly well protected against the introduction of water.

The aircraft door sealing system is therefore particularly highly suitable for sealing an aircraft door arrangement which is arranged in the region of a lower deck of an aircraft and which therefore in the event of a water landing of the aircraft is intended to prevent water from entering the inner space of the aircraft for as long as possible. Accordingly, the aircraft door sealing system may, in a particularly advantageous manner, be used for sealing an aircraft door arrangement which is installed in a passenger cabin which is arranged in the region of a lower deck. Alternative possibilities for use of the aircraft door sealing system, for example, for sealing a freight room door arrangement or an aircraft door arrangement which is installed in the region of an upper deck are, however, also possible.

In a preferred embodiment of the aircraft door sealing system, the sealing member of the sealing element is constructed in a tubular manner and has an inner hollow space. For example, the sealing member may, in a non-deformed state, have a substantially hollow-cylindrical cross-section. The cross-sectional shape of the sealing member may, however, be varied in virtually any manner and adapted to the existing installation requirements. Furthermore, the sealing member has at least one ventilation opening which is connected to the inner hollow space. The ventilation opening of the sealing member is preferably arranged in such a manner that, when the aircraft door sealing system is in the state mounted in an aircraft door arrangement, it is connected to an inner space of the aircraft, that is to say, an aircraft cabin which is pressurized during flight operation of the aircraft. Through the ventilation opening, there is then produced a pressure compensation between the pressurized aircraft cabin and the inner hollow space of the sealing element so that in the inner hollow space of the sealing element there is always the same pressure as in the aircraft cabin.

The sealing member and the first counter-bearing portion are positioned relative to each other in such a manner and the sealing member can be resiliently deformed in such a manner that the sealing member is applied to the first counter-bearing portion and forms or increases a contact face between the sealing member and the first counter-bearing portion if, when the aircraft door sealing system is in the state mounted in the aircraft door arrangement, an internal pressure in the inner hollow space of the sealing member corresponds to an internal pressure in an aircraft cabin provided with the aircraft door arrangement. The resilient deformation of the sealing member in contact with the first counter-bearing portion can be adjusted by means of a suitable sizing of the sealing member and a corresponding material selection for the sealing member. If the sealing member and the sealing lip are constructed in an integral manner and from the same material, the adjustment of the resilient deformation of the sealing member is carried out by means of a corresponding selection of the shape and a corresponding sizing of the sealing member. For example, the resilient deformation of the sealing member can be controlled by the selection of a suitable wall thickness of a sealing member which is constructed in a tubular manner.

As explained above, the sealing lip of the sealing element is during normal flight operation of an aircraft provided with the aircraft door sealing system in the unloaded state and is not in contact or is only in contact with a small contact face with the second counter-bearing portion. The sealing member of the sealing element then substantially ensures correct sealing of the aircraft door arrangement in cooperation with the first counter-bearing portion of the counter-bearing element. If, instead of the reduced external pressure during normal flight operation, there is an increased external pressure acting on the sealing element, the sealing action of the sealing member is maintained, that is to say, the sealing member remains applied to the first counter-bearing portion and thus ensures additional sealing of the gap present between the first and the second element of the aircraft door arrangement.

The aircraft door sealing system preferably further comprises a retention member for securing the sealing element to the first element of the aircraft door arrangement. The retention member is preferably constructed separately from the sealing element and may itself be constructed integrally or in several parts.

In a preferred embodiment, the retention member comprises a retention profile which comprises a first profile element which can be secured to an inner face of the first element of the aircraft door arrangement and a second profile element. The term "inner face" refers in this instance to a face of the first element of the aircraft door arrangement which when the aircraft door arrangement is in the state installed in an aircraft faces the inner space of the aircraft. The second profile element of the retention profile extends preferably substantially perpendicularly to the first profile element in the direction of the sealing lip of the sealing element. The second profile element protects the sealing element from mechanical loads.

Furthermore, the retention member may comprise a retention clamp which cooperates with a base portion of the sealing element in order to fix the sealing element to the retention member. For example, the retention clamp may be secured to the first profile element of the retention profile and accordingly fix the sealing element to the first profile element of the retention profile. The base portion of the sealing element which is preferably constructed integrally with the sealing member and the sealing lip is preferably gripped by the retention clamp and thereby securely fixed to the retention member. If desirable, the base portion of the sealing element may also be adhesively bonded to the retention clamp.

The sealing lip of the sealing element preferably has a first portion which extends substantially parallel with the second profile element of the retention profile and a second portion which protrudes beyond the second profile element of the retention profile in the direction of the second counter-bearing portion. The second portion of the sealing lip which extends beyond the second profile element is subjected to the external pressure applied in the gap between the first and the second element of the aircraft door arrangement and is accordingly resiliently deformed and pressed against the second counter-bearing portion when the external pressure exceeds the threshold value.

The counter-bearing element may comprise a first securing portion having a free first end and a second end. The first and the second counter-bearing portions are preferably connected to the second end of the first securing portion. A free end of the first counter-bearing portion can then, as described above, cooperate with the sealing member of the sealing element. A sealing surface of the second counter-bearing portion facing the sealing lip is in contrast preferably provided to cooperate with the sealing lip of the sealing element.

The first and the second counter-bearing portions of the counter-bearing element preferably extend substantially perpendicularly to each other. Another design of the counter-bearing element is, however, also possible.

Furthermore, the counter-bearing element may comprise a second securing portion which is connected to the second counter-bearing portion. The second securing portion may, for example, extend at an angle of approximately from 120 to 130° relative to the second counter-bearing portion. Two securing portions enable a particularly secure fixing of the counter-bearing element to the second element of the aircraft door arrangement.

An aircraft door arrangement comprises a first element, a second element and an above-described aircraft door sealing system. The sealing element of the aircraft door sealing system is secured to the first element while the counter-bearing element of the aircraft door sealing system is secured to the second element.

In a preferred embodiment of the aircraft door arrangement, the first element is constructed in the form of an aircraft door, while the second element is constructed in the form of a door frame. However, a transposed configuration is also conceivable, that is to say, the first element of the aircraft door arrangement may also be constructed in the form of a door frame, while the second element may also be constructed in the form of an aircraft door.

The second element of the aircraft door arrangement which is constructed in the form of a door frame may comprise at least one aircraft primary structural component which is arranged adjacent to a door opening of the aircraft door arrangement. The aircraft primary structural component may be a frame or a stringer. For example, frames which extend along two parallel longitudinal sides of the door opening may form components of the second element of the aircraft door arrangement which is constructed in the form of a door frame. Furthermore, the second element of the aircraft door arrangement in the form of a door frame may comprise two stringers which extend adjacent to a lower or an upper edge of the door opening. Furthermore, the second element of the aircraft door arrangement which is constructed in the form of a door frame may comprise at least one securing strut.

The securing strut is preferably secured to the aircraft primary structural component and extends from the aircraft primary structural component in the direction of the door opening. The securing strut may be constructed integrally and extend along the entire periphery of the door opening. Alternatively, the aircraft door arrangement may, however, also comprise a plurality of securing struts which are arranged so as to be distributed along the periphery of the door opening.

The first securing portion of the counter-bearing element is preferably secured to the securing strut. The second securing portion of the counter-bearing element is preferably secured to the aircraft primary structural component. A secure fixing of the counter-bearing element is thereby ensured.

BRIEF DESCRIPTION OF THE DRAWINGS

Preferred embodiments of an aircraft door sealing system and an aircraft door arrangement are explained in greater detail below with reference to the appended schematic Figures, in which:

FIG. 2 shows the aircraft door arrangement according to FIG. 1 after a water landing of an aircraft which is provided with the aircraft door arrangement.

DETAILED DESCRIPTION OF THE PREFERRED EMBODIMENTS

Figure 1:
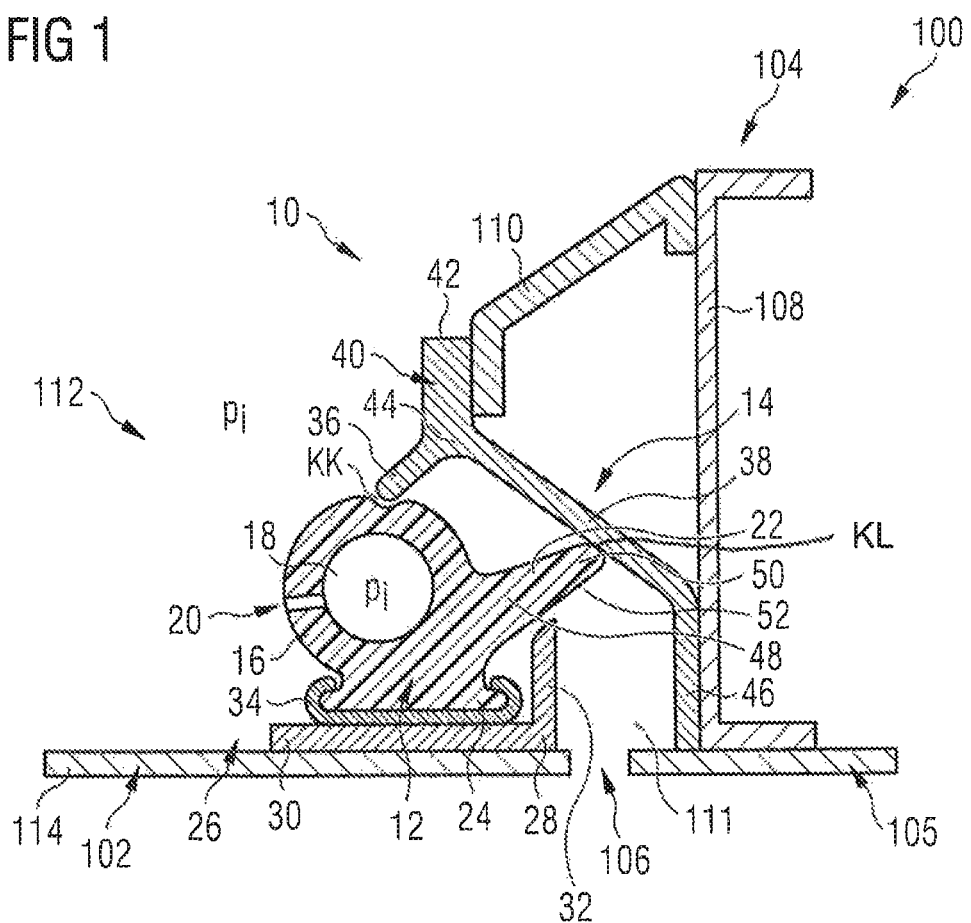
FIG. 1 shows an aircraft door arrangement with an aircraft door sealing system during flight operation of an aircraft which is provided with the aircraft door arrangement.

FIGS. 1 and 2 each show an aircraft door arrangement 100. The aircraft door arrangement 100 comprises a first element 102 and a second element 104. The first element 102 is constructed in the form of an aircraft door, while the second element 104 is constructed in the form of a door frame which is suitable for receiving the aircraft door. The first element 102 which is constructed in the form of an aircraft door closes a door opening 106 which is formed in an aircraft outer skin 105. The aircraft door arrangement 100 which is illustrated in FIGS. 1 and 2 is installed in an aircraft passenger cabin which is located in a lower deck region of a commercial aircraft.

In the embodiment shown in this instance of an aircraft door arrangement 100, the second element 104, which is constructed in the form of a door frame, comprises an aircraft primary structural component 108 which is arranged adjacent to the door opening 106. In the section shown in the Figures, in the region of a longitudinal side of the door opening 106, the primary structural component 108 is constructed in the form of a frame which extends adjacent to and substantially parallel with the longitudinal side of the door opening 106. Furthermore, the second element 104 comprises two stringers which are not shown in the Figures and which extend adjacent to a lower or an upper edge of the door opening 106. A securing strut 110 is secured on the aircraft primary structural components 108 and extends from the aircraft primary structural component 108 in the direction of the door opening 106. The securing strut 110 extends along the entire periphery of the door opening 106.

The aircraft door arrangement 100 is sealed by means of an aircraft door sealing system 10. The aircraft door sealing system 10 comprises a sealing element 12 which comprises a resiliently deformable material, for example, an elastomer material, and a counter-bearing element 14 which comprises a rigid material, for example, metal or plastics material. The counter-bearing element 14 is configured to cooperate with the sealing element 12 in order to seal a gap 111 which is provided between the first and the second element 102, 104 of the aircraft door arrangement 100.

The sealing element 12 comprises a sealing member 16 which is constructed in a tubular manner and which has a substantially hollow-cylindrical cross-section having an inner hollow space 18. Furthermore, the sealing member 16 has a ventilation opening 20 which is connected to the inner hollow space 18 and which is positioned in such a manner that it is connected to an inner space of an aircraft which is provided with the aircraft door arrangement 100, that is to say, an aircraft cabin 112 which is pressurized during flight operation of the aircraft. As a result of the ventilation opening 20, there is produced a pressure compensation between the aircraft cabin 112 and the inner hollow space 18 of the sealing element 12 so that in the inner hollow space 18 of the sealing element 12 there is always applied the same pressure pi as in the pressurized aircraft cabin.

A sealing lip 22 extends from the sealing member 16 of the sealing element 12. Furthermore, the sealing element 12 has a base portion 24. The sealing member 16, the sealing lip 22 and the base portion 24 of the sealing element 12 are constructed integrally. A retention member 26 serves to secure the sealing element 12 to the first element 102 of the aircraft door arrangement 100. The retention member 26 comprises a retention profile 28 which has a first profile element 30 which is secured to an inner face 114 of the first element 102 of the aircraft door arrangement 100 and a second profile element 32 which extends substantially perpendicularly to the first profile element 30 in the direction of the aircraft cabin 112 and the sealing lip 22 of the sealing element 12.

A retention clamp 34 of the retention member 26 is secured to a surface of the first profile element 30 facing away from the first element 102 of the aircraft door arrangement 100 and cooperates with the base portion 24 of the sealing element 12 in order to fix the sealing element 12 to the retention member 26 or the first profile element 30. Furthermore, the base portion 24 of the sealing element 12 may also be adhesively bonded to the retention clamp 34.

The counter-bearing element 14 comprises a first counter-bearing portion 36 which is provided to cooperate with the sealing member 16 of the sealing element 12 and a second counter-bearing portion 38 which is provided to cooperate with the sealing lip 22 of the sealing element 12 and which extends substantially perpendicularly to the first counter-bearing portion 36. Furthermore, the counter-bearing element 14 comprises a first securing portion 40 having a free first end 42 and a second end 44. The first and the second counter-bearing portions 36, 38 are connected to the second end 44 of the first securing portion 40. Finally, the counter-bearing element 14 comprises a second securing portion 46 which is connected to the second counter-bearing portion 38 and which extends at an angle of approximately from 120 to 130° relative to the second counter-bearing portion 38. By means of the first securing portion 40, the counter-bearing element 14 is secured to the securing strut 110, while the second securing portion 46 serves to fix the counter-bearing element 14 to the aircraft primary structural component 108.

The first counter-bearing portion 36 of the counter-bearing element 14 extends in the direction of the sealing member 16 of the sealing element 12. Furthermore, the spacing between a free end of the first counter-bearing portion 36 and the sealing member 16 is selected in such a manner that the sealing member 16, as shown in FIG. 1, is resiliently deformed and is applied to the free end of the first counter-bearing portion 36 when the internal pressure pi in the inner hollow space 18 of the sealing member 16 corresponds to the internal pressure pi in the aircraft cabin 112. A contact face KK is thereby formed between the sealing member 16 and the first counter-bearing portion 36, whereby the aircraft cabin 112 during flight operation of the aircraft when the aircraft cabin 112 is under an internal pressure pi which is higher than the external pressure is also securely sealed with respect to the outside atmosphere. The sealing lip 22 remains in this instance in the unloaded state and does not become deformed and has no or only slight contact with the second counter-bearing portion 38.

The sealing lip 22 of the sealing element 12 has a first portion 48 which extends substantially parallel with the second profile element 32 of the retention profile 28 and a second portion 50 which extends beyond the second profile element 32 of the retention profile 28 in the direction of the second counter-bearing portion 38. The second portion 50 of the sealing lip 22 which extends beyond the second profile element 32 is subjected to the external pressure which is present in the gap 111 between the first and the second elements 102, 104 of the aircraft door arrangement 100.

Furthermore, the spacing between the sealing lip 22 and the second counter-bearing portion 38 is selected in such a manner that the sealing lip 22, as shown in FIG. 2, is resiliently deformed and is applied to the second counter-bearing portion 38, that is to say, a sealing surface of the second counter-bearing portion 38 facing the sealing lip 22, when the external pressure which acts on an outer face 52 of the sealing lip 22 via the gap 111 exceeds a threshold value.

As a result of the resilient deformation of the sealing lip 22, a contact face KL is formed or increases between the sealing lip 22 and the second counter-bearing portion 38. The threshold value corresponds to the water pressure pw acting on the outer face 52 of the sealing lip 22 in the event of a water landing of the aircraft which is provided with the aircraft door sealing system 10. The sealing contact between the sealing member 16 of the sealing element 12 and the first counter-bearing portion 36 remains unchanged. In the event of a water landing of the aircraft, the sealing lip 22 together with the second counter-bearing portion 38 of the counter-bearing element 14 consequently ensures a reliable sealing of the gap 111 between the first and the second elements 102, 104 of the aircraft door arrangement 100. The sealing member 16 of the sealing element 12 together with the first counter-bearing portion 36 of the counter-bearing element 14 ensures an additional sealing.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft door sealing system comprising:
   a sealing element which comprises a resilient material and which can be secured to a first element of an aircraft door arrangement and which comprises a sealing member and a sealing lip which extends from the sealing member, and
   a counter-bearing element which comprises a rigid material and which can be secured to a second element of the aircraft door arrangement and which is configured to cooperate with the sealing element in order to seal a gap which is present between the first and the second element of the aircraft door arrangement and which has a first counter-bearing portion which is provided to cooperate with the sealing member of the sealing element and a second counter-bearing portion which is provided to cooperate with the sealing lip of the sealing element,
   wherein the sealing lip and the second counter-bearing portion are positioned relative to each other in such a manner and the sealing lip can be resiliently deformed in such a manner that the sealing lip is applied to the second counter-bearing portion, and a contact face between the sealing lip and the second counter-bearing portion is formed or increases when an external pressure which acts on an outer face of the sealing lip via the gap between the first and the second element of the aircraft door arrangement, when the aircraft door sealing system is in a state mounted in the aircraft door arrangement, exceeds a threshold value, wherein the sealing member of the sealing element is constructed in a tubular manner and has an inner hollow space and at least one ventilation opening which is connected to the inner hollow space, wherein the counter-bearing element comprises a first securing portion having a free first end and a second end, and wherein the first and the second counter-bearing portions are connected to the second end of the first securing portion, wherein the counter-bearing element further comprises a second securing portion which is connected to the second counter-bearing portion, wherein the second securing portion extends at an angle of approximately from 120 to 130° relative to the second counter-bearing portion.

2. The aircraft door sealing system according to claim 1, wherein the threshold value corresponds to a water pressure which acts on the outer face of the sealing lip in the event of a water landing of an aircraft which is provided with the aircraft door sealing system.

3. The aircraft door sealing system according to claim 1, wherein the sealing member and the first counter-bearing portion are positioned relative to each other in such a manner and the sealing member can be resiliently deformed in such a manner that the sealing member is applied to the first counter-bearing portion, and a contact face between the sealing member and the first counter-bearing portion is formed or increases if, when the aircraft door sealing system is in the state mounted in the aircraft door arrangement, an internal pressure in the inner hollow space of the sealing member corresponds to an internal pressure in an aircraft cabin provided with the aircraft door arrangement.

4. The aircraft door sealing system according to claim 1, further comprising a retention member to secure the sealing element to the first element of the aircraft door arrangement.

5. The aircraft door sealing system according to claim 4, wherein the retention member comprises at least one of:
a retention profile which comprises a first profile element which can be secured to an inner face of the first element of the aircraft door arrangement and a second profile element which extends substantially perpendicularly to the first profile element, or a retention clamp which cooperates with a base portion of the sealing element in order to fix the sealing element to the first profile element of the retention profile of the retention member.

6. The aircraft door sealing system according to claim 5, wherein the retention member comprises the retention profile which comprises the first profile element and the second profile element, wherein the sealing lip of the sealing element has a first portion which extends substantially parallel with the second profile element of the retention profile and a second portion which protrudes beyond the second profile element of the retention profile in a direction of the second counter-bearing portion.

7. The aircraft door sealing system according to claim 1, wherein the first and the second counter-bearing portions of the counter-bearing element extend substantially perpendicularly to each other.

8. An aircraft door arrangement comprising:
a first element,
a second element, and
an aircraft door sealing system according to claim 1,
wherein the sealing element of the aircraft door sealing system is secured to the first element and the counter-bearing element of the aircraft door sealing system is secured to the second element.

9. The aircraft door arrangement according to claim 8, wherein the first element is constructed as an aircraft door and the second element is constructed as a door frame.

10. The aircraft door arrangement according to claim 9, wherein the second element comprises at least one aircraft primary structural component which is arranged adjacent to a door opening of the aircraft door arrangement and a securing strut.

11. The aircraft door arrangement according to claim 10, wherein the securing strut is secured to the aircraft primary structural component and extends from the aircraft primary structural component in a direction of the door opening.

12. The aircraft door arrangement according to claim 10, wherein the first securing portion of the counter-bearing element is secured to the securing strut.

13. The aircraft door arrangement according to claim 10, wherein a second securing portion of the counter-bearing element is secured to the aircraft primary structural component.

* * * * *